US010368553B2

(12) United States Patent
Schimitzek

(10) Patent No.: US 10,368,553 B2
(45) Date of Patent: Aug. 6, 2019

(54) APPARATUS AND METHOD FOR ASSESSING COMPLIANCE WITH ANIMAL WELFARE ON AN ANIMAL FOR SLAUGHTER

(71) Applicant: CSB-SYSTEM AG, Geilenkirchen (DE)

(72) Inventor: Peter Schimitzek, Geilenkirchen (DE)

(73) Assignee: CSB-System AG, Geilenkirchen (DE)

( * ) Notice: Subject to any disclaimer, the term of this patent is extended or adjusted under 35 U.S.C. 154(b) by 327 days.

(21) Appl. No.: 15/507,262

(22) PCT Filed: Aug. 12, 2015

(86) PCT No.: PCT/DE2015/000399
§ 371 (c)(1),
(2) Date: Feb. 28, 2017

(87) PCT Pub. No.: WO2016/029893
PCT Pub. Date: Mar. 3, 2016

(65) Prior Publication Data
US 2017/0273318 A1    Sep. 28, 2017

(30) Foreign Application Priority Data

Aug. 29, 2014  (DE) .................. 10 2014 012 558
Aug. 29, 2014  (DE) .................. 20 2014 006 905 U

(51) Int. Cl.
*A22B 5/00* (2006.01)
*A22B 3/00* (2006.01)

(52) U.S. Cl.
CPC .............. *A22B 5/00* (2013.01); *A22B 3/00* (2013.01); *A22B 5/007* (2013.01); *A22B 5/0064* (2013.01)

(58) Field of Classification Search
CPC .......... A22B 5/00; A22B 5/0064; A22B 5/007
USPC ............................................... 452/198
See application file for complete search history.

(56) References Cited

U.S. PATENT DOCUMENTS

| 5,890,377 | A    |     | 11/1999 | Zwanikken et al. |             |
|-----------|------|-----|---------|------------------|-------------|
| 6,299,524 | B1   |     | 10/2001 | Janssen et al.   |             |
| 7,209,588 | B2   | *   | 4/2007  | Liang            | A61B 5/1113 |
|           |      |     |         |                  | 119/421     |
| 7,853,046 | B2   | *   | 12/2010 | Sharony          | A01K 29/00  |
|           |      |     |         |                  | 356/603     |
| 8,297,231 | B2   | *   | 10/2012 | Yanai            | G06F 19/3418|
|           |      |     |         |                  | 119/174     |

(Continued)

*Primary Examiner* — Richard T Price, Jr.
(74) *Attorney, Agent, or Firm* — Laurence A. Greenberg; Werner H. Stemer; Ralph E. Locher

(57) ABSTRACT

An apparatus for assessing compliance with animal welfare on an animal for slaughter. The apparatus has an image capture unit with a capture region in which a section of a surface of the animal is optically captured and in which pixels are captured. The capture unit provides pixel data in a transmittable manner. The apparatus has an evaluation unit connected to the capture unit to capture the pixel data. A normative model of the animal is stored in the evaluation unit and represents a formation of animal-related features conforming to animal welfare. The evaluation unit relates the pixel data to the model and determines a deviation of the pixel data from the model and provides the deviation as a deviation of the animal from the model in a form that can be output. A method for assessing compliance with animal welfare is carried out on the apparatus.

10 Claims, 2 Drawing Sheets

(56) References Cited

U.S. PATENT DOCUMENTS

2006/0126903 A1 6/2006 Sharony
2014/0029808 A1 1/2014 Lee

* cited by examiner

APPARATUS AND METHOD FOR ASSESSING COMPLIANCE WITH ANIMAL WELFARE ON AN ANIMAL FOR SLAUGHTER

BACKGROUND OF THE INVENTION

Field of the Invention

The invention relates to an apparatus and a method for assessing compliance with animal welfare measures on an animal for slaughter.

This invention is based on the general requirement to comply with the laws regulating animal welfare, particularly when keeping animals for slaughter.

In this respect, the legislator demands that animal-related features, described in law as animal welfare indicators, are collected and assessed on a farm animal to be able to make a statement whether applicable animal welfare requirements are met in a breeding farm or whether measures are to be taken to improve the husbandry conditions in the farm.

Bite, stroke, electrode and tattoo device marks on an animal for slaughter as well as injuries on its tail or ear are recorded as deviations from the formation of animal welfare indicators complying with animal welfare rules.

Moreover, such a detection of the deviations can be useful during the processing chain of animals for slaughter to assess the meat quality because the quality of the meat can depend on the animal welfare indicators in such a way that existing deviations on an animal for slaughter from a formation which does not comply with animal welfare lead to worse meat quality. It is for example possible that premortal stress due to biting can result in an increased loss of drip fluid or hit marks can lead to bloody fine cuts of the animal for slaughter.

Checks for identifying animal welfare indicators on an individual animal for slaughter within a receiving inspection in a slaughterhouse is known from the state of the art. Such a check is performed manually by appropriately trained personnel.

The disadvantages of such a check, however, are to be found particularly first in the costs required for providing such personnel and, secondly, in the relatively low rate of a manual check thus possibly prolonging the subsequent processing of the animals for slaughter.

Furthermore, the assessment of deviations from formations of animal welfare indicators complying with animal welfare is always a result of subjective considerations of the individual persons, which inevitably leads to different assessments and cannot exclude errors of assessment.

BRIEF SUMMARY OF THE INVENTION

It is the object of this invention to provide an apparatus and a method for assessing the compliance with animal welfare on an animal for slaughter which allow a cost-effective, efficient and moreover objective assessment of the compliance with measures related to animal welfare.

This task is fulfilled by an apparatus having the features specified in in the independent claim and by a method having the features specified in in method claims. Preferred further embodiments of the invention are described in the corresponding dependent claims.

An apparatus according to the invention for assessing the compliance with animal welfare is used, in particular, during a receiving inspection, preferably after killing, brewing, flambéing and brushing, but advantageously before cutting an animal for slaughter in a slaughterhouse, and it serves to check the animal for slaughter, which shall be processed, for possibly existing animal-welfare-related deviations from defined animal welfare indicators.

Within the context of this invention, animal welfare indicators are animal-related features which make it possible to assess whether or not the animal for slaughter was kept in conditions complying with animal welfare regulations. Examples of animal welfare indicators are skin color, skin surface texture, outer contours or physical characteristics such as the healthy condition of all parts of the animal body. If the animal welfare indicators comply with standard formations, they are considered to be evidence of animal husbandry according to welfare and thus of compliance with animal welfare regulations. The standard formation is also referred to as formation conforming to animal welfare.

The term deviations from the standard refers in the following to specific deviations on the inspected animal for slaughter from the defined standard formations of the animal welfare indicators. Non-standard formations are also referred to as formations not complying with animal welfare. They make it possible to find out that the animal for slaughter was kept in conditions not complying with animal welfare regulations or give reason to further inspections.

The apparatus of the invention comprises an image capture unit with an image capture region in which a section of a surface of the animal for slaughter can be optically captured and in which, moreover, pixels can be captured in this section of the surface.

For this purpose, the animal for slaughter, which has been, for example, hung up on tubular rails, is transported such that it passes the image capture unit so that the relevant section of the surface of the animal for slaughter can be recorded in the image capture region.

According to this invention, the relevant section of the surface of the animal for slaughter corresponds to the entire surface or to a previously determined sub-section of the entire surface of the animal for slaughter.

The image capture unit of this invention can, moreover, provide pixel data of the pixels, in particular area coordinates and brightness and color values of the pixels, in a transmittable form, wherein the pixel data are preferably provided in real time.

With this invention, it is also possible to combine pixel data of several pixels to one data package and subsequently to provide it in a manner which can be output.

The apparatus of this invention further comprises an evaluation unit which is connected to the image capture unit by wire or in a wireless manner and is used to capture the pixel data.

In the evaluation unit of this invention, a normative model of an animal for slaughter is stored.

According to the invention, the normative model contains a formation of animal-related features, i.e. of animal welfare indicators, conforming to animal welfare and said model can expose specific coloring, skin surface texture and outer contours or other characteristics of the animal for slaughter which are important for assessing whether or not the animal for slaughter was kept in compliance with animal welfare regulations. The normative model can be preferentially defined both negatively and positively. A positive definition is the definition of how an animal-related feature is formed on animals which have been kept in accordance with animal welfare rules. A negative definition is the definition of how an animal-related feature is formed on an animal which has been kept in conditions not compliant with animal welfare regulations so that the non-existence of such a formation is defined as a formation conforming to animal welfare. Moreover, certain infringements of animal welfare regulations can be detected in an extremely reliable manner.

In particular, the normative model can provide normative pixel data, hereinafter also referred to as reference pixel data.

The evaluation unit of this invention can relate the pixel data, which can be provided by the image capture unit, to the normative model and determine a deviation of these pixel data from the normative model.

For this purpose, the pixel data are preferably compared to the individually corresponding reference pixel data and the deviation of the pixel data from the reference pixel data, e.g. concerning area coordinates or brightness and color values, is determined.

To determine a deviation of the pixel data from the reference pixel data, the pixel data can be transferred, for example, to a coordinate system in which the reference pixel data have already been entered. In this way it is also possible that a visually represented model of the animal for slaughter checked can be created on the basis of the pixel data and can be compared with the normative model, which in this case is provided as a visually representable, normative model.

To allow a subsequent verification, such a comparison of the visually presentable models can be additionally made by appropriate staff in an advantageous further development.

The evaluation algorithm described is based on reference pixel data and is to be understood as an exemplary explanation. However, each appropriate algorithm can be used for image evaluations, including object detection and classification.

Furthermore, the evaluation unit can provide, in a transmittable form, the determined deviation of the pixel data from the normative model as a deviation of the animal for slaughter from the standard compared to the normative model.

The provision of the deviation from the standard in a transmittable form can be, for example, a provision as an image or as a defined output value which particularly reveals the kind and/or frequency of the occurrence of the individual deviation from the standard or its degree regarding intensity, size or color.

The apparatus of this invention has the particular advantage that existing deviations from the standard are recorded in an automated manner so that, compared to conventional methods, the time required for checking the animal for slaughter can be considerably reduced.

In addition to this, variances and errors in the assessment of the formation of the animal welfare indicators can be avoided by automated registration and evaluation, and the results of the assessment can be transferred to a data management system in an automated manner. Furthermore, the costs for a check of the animal for slaughter can be reduced because staff is not required.

In a preferred further development of the invention, the image capture unit consists of a plurality of image cameras, wherein each image camera has an image capture sub-region, and wherein the image cameras are preferentially arranged such that they can capture the complete animal for slaughter by their image capture sub-regions.

The image capture sub-regions together form the image capture region, wherein in each image capture sub-region pixels of a section of the surface of the animal for slaughter can be recorded, and wherein the pixel data of the pixels of each image capture sub-region can be provided in a manner which can be output.

Subsequently, the evaluation unit amalgamates the pixel data, although alternatively this amalgamation can already be made in the evaluation unit.

A benefit of the solution is the fact that occlusion effects are avoided or limited.

If the image capture sub-regions overlap each other, the pixel data of the several cameras for the overlapped region can be put together for evaluation purposes. This step can increase the capture and evaluation reliability, in particular by the avoidance of double detections of one and the same deviation from the standard. Moreover, the spatial resolution can be increased, and in an advantageous arrangement of the several cameras the overlapping areas are provided such that the entire surface is covered by overlapping areas. Moreover, this arrangement can be used for a 3D capture.

In another variant, image sequences can be taken by the image camera or the image cameras by utilizing the transport movement of the animal for slaughter, and the pixel data of the single images are put together in the evaluation process so that the benefit of improved resolution is given and 3D capture is also possible here.

In a further variant, image sequences can be taken by means of camera tracking and, also in this variant, the pixel data of the single images are put together in the evaluation process so that the benefit of improved resolution and the option of 3D capture are given here, too. Camera tracking can be done mechanically, for example, by transmitting a movement of the transport system, or in an intelligent manner, for example by analyzing the position of the animal for slaughter in the image.

In an advantageous embodiment of the invention, the deviation from the standard can be classified and provided in a classified, transmittable form.

Preferentially, the deviation from the standard is classified by the evaluation unit such that, depending on its degree, it is assigned to a previously defined class.

The specific classes of deviations from the standard can be defined, for example, within an auto-learning cycle.

The classification of the detected deviation from the standard offers the particular advantage that it is possible to make a statement about the degree and kind of the deviation from the standard already at this stage. Therefore, staff for a later verification of the deviation from the standard is not required.

Furthermore, the evaluation unit can provide the deviation from the standard in a transmittable form, i.e. the evaluation unit can provide the defined deviation from the standard according to class and kind in a transmittable form, for example, as a clear designation or visual presentation. Afterwards, the deviation from the standard can be presented by a visualization unit or transferred to a database to be stored and/or to an electronic data processing system to be further used.

In a further advantageous development of the invention, the deviation from the standard recorded can be, moreover, assigned to a dataset related to an animal for slaughter.

In this embodiment, such an animal-related dataset is created for each animal for slaughter, which runs through the corresponding slaughter process, and contains more detailed information on this animal for slaughter. Thus, the dataset related to the animal for slaughter can include, for example, data about kind and origin of the animal for slaughter, its sex or its weight and dimensions.

The assignment of the detected deviation from the standard to the dataset which is related to an animal for slaughter offers the advantage that the detailed data can be stored with the corresponding animal for slaughter and that, consequently, a long-term traceability of the data required for assessing the compliance with animal welfare regulations is ensured.

In a preferred embodiment of the apparatus of the invention, external units can be triggered on the basis of the deviation from the standard detected.

Such external units are in particular, sorting units which can, on the basis of the deviation from the standard identified, discharge the animal for slaughter recorded out of the running slaughter process and supply it to a follow-up check and/or to subsequent processing steps.

In the apparatus of this invention, the evaluation unit generates, for example, a control signal on the basis of the deviation from the standard detected and transmits this signal directly or indirectly to the external units via a central process control.

In a further advantageous development of the apparatus, the image capture unit comprises at least one depth camera with a depth camera capture region, wherein the section of the surface of the animal for slaughter can be optically captured in the depth camera capture region, and wherein pixels can be recorded in the depth camera region.

In the invention, the image capture unit can provide, in a transmittable form, spatial coordinates of the pixels recorded which are composed of the area coordinates (x, y) and a depth value (z).

The pixels captured by the depth camera can be identical to the pixels which are also captured by an image camera of the image capture unit. Alternatively, the pixels captured by the depth camera can differ from the ones captured by the image camera in order to record in this way, for example, specific sections of the surface of the animal for slaughter only by the depth camera or only by the image camera.

The particular advantage of the depth camera in this invention is that it can record deviations from the standard which are defined by different heights of the surface of the animal for slaughter. Such deviations from the standard can be, for example, swelling, bite marks, ear injuries or abscesses which are due to animal husbandry not complying with animal welfare regulations.

In this further embodiment of the invention, the image capture unit can also comprise several depth cameras with each of them having one depth camera capture region, and these depth cameras are positioned relative to each other such that the depth camera capture regions adjoin or partly overlap each other.

This arrangement offers the particular advantage that the entire surface of the animal for slaughter to be checked can be captured by the depth cameras.

Correspondingly to the provision of the pixel data, the image capture unit preferentially provides the spatial coordinates in real time.

A method of this invention for assessing compliance with animal welfare on an animal for slaughter is performed by using an image capture unit with an image capture region, in which a section of a surface of the animal for slaughter can be optically captured and in which pixels can be captured, and wherein the image capture unit can provide the pixel data of the pixels in a transmittable form, and by using an evaluation unit which is connected to the image capture unit and which can record the pixel data, wherein a normative model of the animal for slaughter is stored in the evaluation unit, and wherein said normative model represents a formation of animal-related features (animal welfare indicators) conforming to animal welfare, and wherein the evaluation unit can compare the pixel data with the normative model and detect a deviation of the pixel data from the normative model, and wherein the evaluation unit can provide the deviation, in a transmittable form, as a deviation of the animal for slaughter from the standard in comparison to the normative model, and said method comprises the following process steps:

a) capturing the pixels by the image capture unit,
b) providing the pixel data of the pixels recorded by the image capture unit in a transmittable form and transferring them to the evaluation unit,
c) recording the provided pixel data by the evaluation unit,
d) comparing the pixel data recorded with the normative model by the evaluation unit,
e) determining an existing deviation of the pixel data from the normative model by the evaluation unit,
f) providing the deviation defined as a deviation from the standard in a transmittable form by the evaluation unit.

In the process step a), the pixels in the corresponding relevant section of the surface of the animal for slaughter are optically recorded.

For this purpose, the animal for slaughter is preferentially transported such that it passes the image capture unit so that the relevant section of the surface is recorded in the image capture region. It is possible that the pixel recording is started and stopped via a light barrier signal.

It is also possible that the image capture unit determines and performs the start and end of the pixel recording on its own. In this solution, the image capture region, in which an animal for slaughter passes the image capture unit, is continuously monitored and the pixel recording will be automatically started when the animal for slaughter is detected. When the animal for slaughter has left the image capture region, the image capture unit automatically stops the pixel recording process.

The particular advantage of this solution is that an additional device for initializing the recording process is not required.

Alternatively, for a mobile image capture unit in particular, this unit can be moved such that it passes the animal for slaughter and thus the relevant section of the surface is recorded in the image capture region.

In the second process step b), the pixel data of the pixels recorded are provided by the image capture unit in a transmittable form and subsequently transferred to the evaluation unit.

The data are preferentially provided in a transmittable form in real time, wherein either the pixel data of each pixel recorded can be provided individually in a transmittable form or the pixel data of several pixels can be put together to a data package which can then be provided in a transmittable form.

Alternatively, it is also possible to collect the pixel data of all recorded pixels in a buffer first and to provide this data package in a transmittable form after the completion of the image capture process.

In the process step c), the pixel data provided in a transmittable form are recorded by the evaluation unit. For this purpose, the evaluation unit is, as described above, connected to the image capture unit and this connection can use wires or be wireless.

In the subsequent process step d), the evaluation unit compares the pixel data recorded with the normative model of an animal for slaughter.

For this purpose, the normative model is stored in the evaluation unit and contains, according to the invention, a formation of animal-related features of the animal for slaughter which comply with animal welfare regulations.

The animal-related features are also referred to as animal welfare indicators.

The normative model of this invention can show normative formations regarding, for example, specific coloring, skin surface texture, outer contours or other characteristics of the animal for slaughter which are relevant for assessing compliance with animal welfare regulations. Preferentially, the normative model can provide normative pixel data which are hereinafter referred to as reference pixel data.

In order to compare the recorded pixel data with the normative model, the evaluation unit is capable to relate the pixel data, which can be provided by the image capture unit, to the normative model and to determine an existing deviation of these pixel data from the normative model in the processing step e). In this procedure, the evaluation unit performs appropriate evaluation algorithms. The pixel data are, for example, compared to the individually corresponding reference pixel data and the deviation of the pixel data from the reference pixel data, e.g. concerning area coordinates or brightness and color values, is determined.

In the final process step f), the evaluation unit provides, in a transmittable form, the determined deviation of the recorded pixel data from the normative model as a deviation from the standard.

The transmittable deviation from the standard can be provided, for example, as an image representation or as a defined output value which particularly reveals the kind and/or frequency of the occurrence of the individual deviation from the standard or its intensity, size or color.

In a further preferred development of the method an additional process step g) is performed after the process step f).

In this process step g), the deviation from the standard is classified and the classified deviation from the standard is provided in a transmittable form by the evaluation unit.

In this process, the evaluation unit assigns the detected deviation from the standard, depending on its degree, to a previously defined class of deviations from the standard and subsequently provides the deviation from the standard, with indication of the class to which it has been assigned, in a transmittable form.

In a further preferred variant of the method, an additional process step h) is performed after the process step f), and in this process step h) the recorded deviation from the standard is assigned to a dataset related with an animal for slaughter.

Such a dataset related to an animal for slaughter is created for an animal for slaughter, for example in the processing chain of an animal for slaughter, and particularly contains information about the origin of the animal for slaughter or about its sex and weight.

In this variant, the dataset related with an animal for slaughter is stored in a database which is either connected to the evaluation unit or alternatively integrated into it.

The assignment of the deviation from the standard to the dataset related to a specific animal for slaughter makes a traceable archiving of the deviation from the standard and a long-term traceability of the performed assessment of compliance with animal welfare possible.

Within the method of this invention, the process step h) can be taken before, after or as an alternative to the process step g).

Moreover, in an advantageous further development of the method, an additional process step i) is performed after the process step f), and in this process step i) external units are triggered on the basis of the deviation from the standard recorded.

Such external units are, for example, sorting units which can discharge an animal for slaughter recorded out of the running slaughter process and supply it to specific subsequent processing steps.

In the further development described here, the evaluation unit can generate a control signal on the basis of the deviation from the standard detected and transmit it to the external units.

BRIEF DESCRIPTION OF THE SEVERAL VIEWS OF THE DRAWING

In the following, the invention is explained in more detail by means of schematic drawings. They show.

DESCRIPTION OF THE INVENTION

Figure 1:
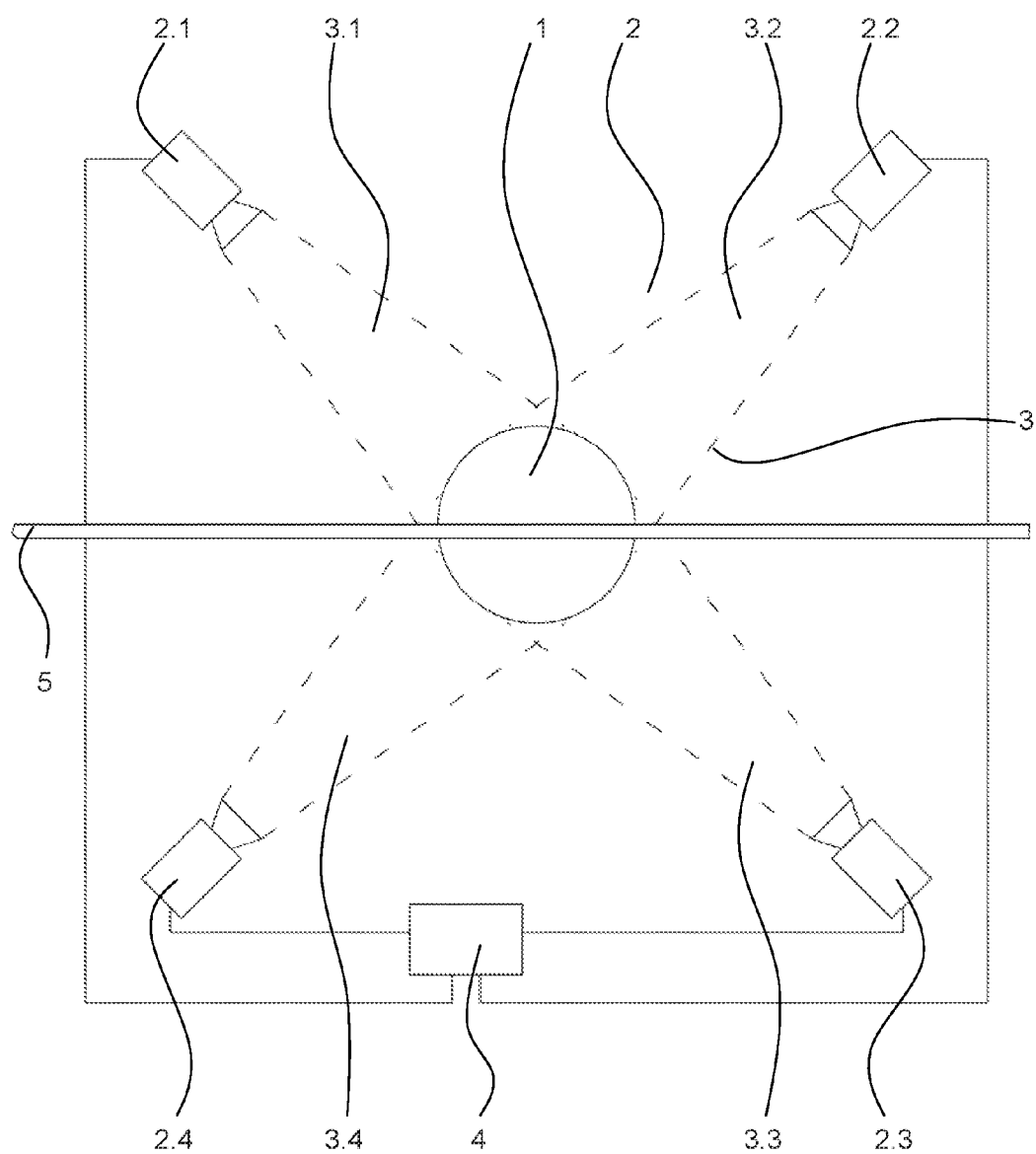
FIG. 1 Schematic diagram (top view) with schematic representation of the animal for slaughter, FIG. 2 Schematic drawing (lateral view).

FIG. 1 shows an apparatus of the invention for assessing compliance with animal welfare on an animal for slaughter 1 in a top view with the animal for slaughter being only schematically represented.

The apparatus of this invention comprises an image capture unit 2 with an image capture region 3, wherein the image capture unit 2 consists of four image cameras 2.1 to 2.4 with each having an image capture region 3.1 to 3.4., and wherein the image capture region 3 is composed of the image capture sub-regions 3.1 to 3.4.

According to this invention, pixels can be recorded on the surface of the animal for slaughter 1 in the image capture region 3, wherein the image cameras 2.1 to 2.4 of this invention are arranged such that the image capture sub-regions 3.1 to 3.4 partially overlap each other so that the entire surface of the animal for slaughter 1 can be recorded in the image capture region 3.

The image capture unit 2 of this invention is capable to provide pixel data of the pixels recorded in the image capture region 3 in a transmittable form.

The pixel data are in particular area coordinates and color values of the pixels recorded.

As shown in FIG. 1, the apparatus comprises an evaluation unit 4 which is connected to the image cameras 2.1 to 2.4 and, consequently, to the image capture unit 2 and which can gather the pixel data of the image capture unit 2.

Figure 2:
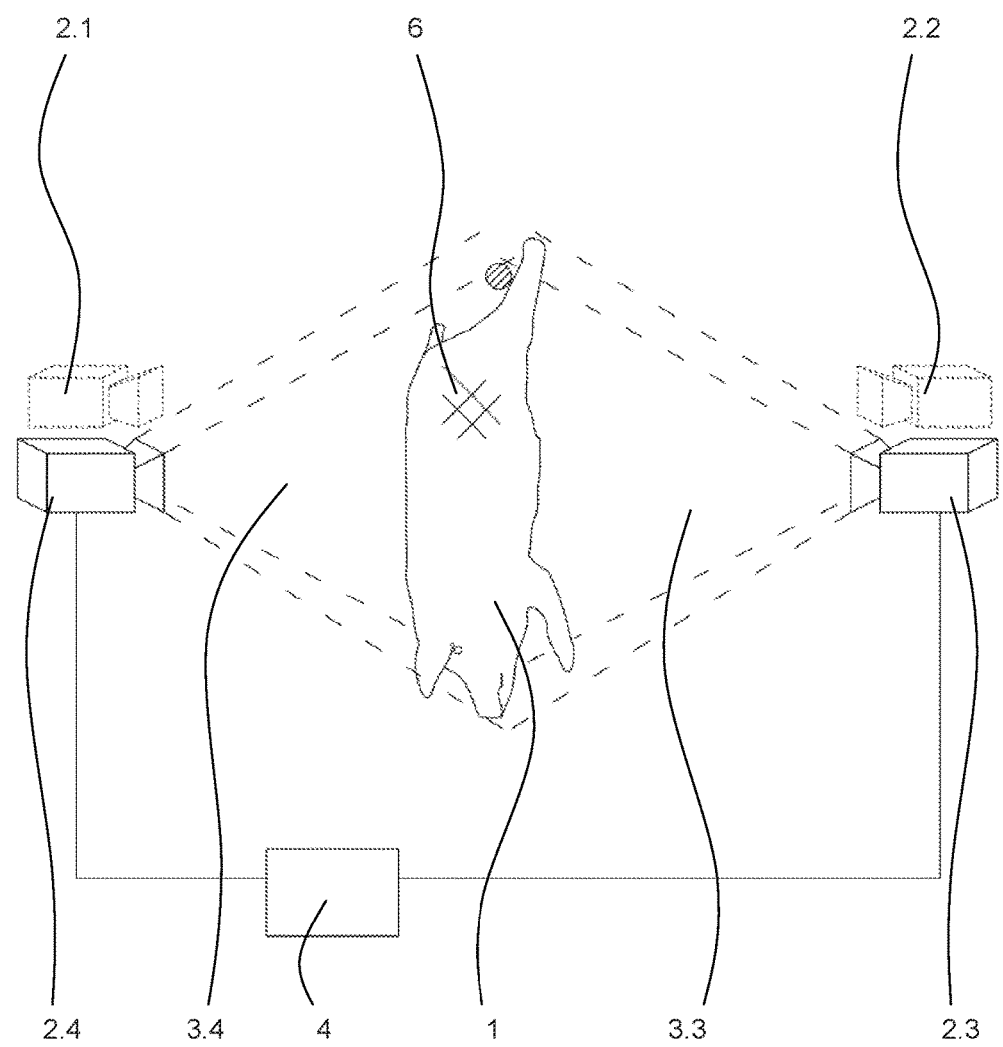

FIG. 2 additionally shows a lateral view of the apparatus of this invention in which the animal for slaughter 1 is a pig for slaughter and has scratch marks 6 in the back part of its body.

The scratch marks 6 constitute a deviation of the animal for slaughter 1 from a previously defined formation of an animal-related feature which indicates that the animal for slaughter 1 was not kept in compliance with animal welfare regulations.

For the sake of clarity, FIG. 2 only shows the image cameras 2.3 and 2.4 with their image capture sub-regions 3.3 and 3.4 completely. The other image cameras 2.1 and 2.2 are only outlined in this figure.

According to the invention, a normative model of the animal for slaughter 1 is stored in the evaluation unit 4, and said model represents a formation of the animal welfare indicators that complies with animal welfare regulations. In other words, the normative model represents an ideal condition of the animal for slaughter 1 which demonstrates compliance with animal welfare and is free of any injuries due to animal husbandry not conforming to animal welfare regulations.

In this embodiment, the normative model particularly comprises the color and representative outer contours of the animal for slaughter 1, for example ear or tail shapes.

According to this invention, the basis for assessing compliance with animal welfare is given by the capability of the evaluation unit 4 to compare the captured pixel data with the normative model and to automatically record the deviation of the pixel data, caused by scratch signs 6, from the normative model.

Subsequently, the evaluation unit 4 can provide the detected deviation from the standard, on which the assessment of compliance with animal welfare is based, in a transmittable form.

LIST OF REFERENCE NUMERALS

1 Animal for slaughter
2 Image capture unit
2.1 to 2.4 Image cameras
3 Image capture region
3.1 to 3.4 Image capture sub-regions
4 Evaluation unit
5 Tubular rails
6 Scratch marks

The invention claimed is:

1. An apparatus for assessing compliance with animal welfare on an animal slaughter, the apparatus comprising:
an image capture unit with an image capture region for optically capturing a section of a surface of the animal for slaughter and for recording pixels in said capture region, said image capture unit providing pixel data of the pixels in a transmittable form; and
an evaluation unit connected to said image capture unit for recording the pixel data, said evaluation unit storing a normative model of the animal for slaughter, the normative model representing a formation of animal-related features complying with animal welfare indicators, said evaluation unit relating the pixel data to the normative model and identifying a deviation of the pixel data from the normative model, and said evaluation unit providing the deviation in a transmittable form as a deviation from a standard of the animal for slaughter.

2. The apparatus according to claim 1, wherein the image capture unit has a plurality of image cameras, each image camera of said plurality of image cameras has a respective image capture sub-region.

3. The apparatus according to claim 1, wherein the deviation from the standard is classified and provided in a classified, transmittable form.

4. The apparatus according to claim 1, wherein the deviation from the standard is assignable to a dataset related to the animal for slaughter.

5. The apparatus according to claim 1, further comprising external units which are triggered on the basis of the deviation from the standard.

6. The apparatus according to claim 1, wherein said image capture unit includes at least one depth camera with a depth camera capture region, the section of the surface of the animal for slaughter is optically captured in the depth camera capture region and pixels are recorded in the depth camera capture region, the image capture unit provides spatial coordinates of the pixels in a transmittable form.

7. A method for assessing compliance with animal welfare on an animal for slaughter, comprising:
providing an image capture unit with an image capture region for optically capturing a section of a surface of the animal for slaughter and for recording pixels in the capture region, the image capture unit providing pixel data of the pixels in a transmittable form;
providing an evaluation unit connected to the image capture unit for recording the pixel data, the evaluation unit for storing a normative model of the animal for slaughter, the normative model representing a formation of animal-related features complying with animal welfare indicators, and the evaluation unit for relating the pixel data to the normative model and identifying a deviation of the pixel data from the normative model and for providing the deviation in a transmittable form as a deviation from a standard of the animal for slaughter;
a) capturing the pixels with the image capture unit;
b) providing the pixel data of the pixels captured by the image capture unit in a transmittable form;
c) recording the provided pixel data with the evaluation unit;
d) comparing the pixel data recorded with the normative model in the evaluation unit;
e) determining an existing deviation of the pixel data from the normative model in the evaluation unit; and
f) providing the deviation as a deviation from the standard in a transmittable form with the evaluation unit.

8. The method according to claim 7, further comprising, after the process step f), classifying the deviation from the standard and providing the deviation from the standard in a transmittable form with the evaluation unit.

9. The method according to claim 7, further comprising, after the process step f), assigning the deviation from the standard to a dataset related to an animal for slaughter.

10. The method according to claim 7, further comprising, after the process step f), triggering external units on the basis of the deviation from the standard.

* * * * *